United States Patent [19]
Exnar et al.

[11] Patent Number: 5,569,561
[45] Date of Patent: Oct. 29, 1996

[54] PRIMARY OR SECONDARY ELECTROCHEMICAL GENERATOR HAVING A NANOPARTICULATE ELECTRODE

[75] Inventors: Ivan Exnar, Itingen; Michael Graetzel, St-Sulpice; Jean-Paul Randin, Cortaillod, all of Switzerland

[73] Assignee: Renata A.G., Itingen, Switzerland

[21] Appl. No.: 375,907

[22] Filed: Jan. 20, 1995

[30] Foreign Application Priority Data

Jan. 21, 1994 [FR] France ................................. 94 00648

[51] Int. Cl.⁶ ................................................ H01M 4/48
[52] U.S. Cl. .......................... 429/218; 429/223; 429/224; 429/194
[58] Field of Search .......................... 429/194, 218, 429/223, 224

[56] References Cited

U.S. PATENT DOCUMENTS

| | | | |
|---|---|---|---|
| Re. 33,149 | 1/1990 | Petrow et al. | 429/218 X |
| 4,049,887 | 9/1977 | Whittingham | 429/194 X |
| 4,104,451 | 8/1978 | Klemann et al. | 429/194 |
| 5,110,696 | 5/1992 | Shokoohi et al. | 429/218 |
| 5,202,201 | 4/1993 | Meunier et al. | 429/193 |
| 5,211,933 | 5/1993 | Barboux et al. | 429/190 X |
| 5,225,296 | 7/1993 | Ohnsawa et al. | 429/218 |

FOREIGN PATENT DOCUMENTS

| | | |
|---|---|---|
| 0127373 | 12/1984 | European Pat. Off. . |
| 0251677 | 1/1988 | European Pat. Off. . |
| 0417802 | 3/1991 | European Pat. Off. . |
| 0460617 | 12/1991 | European Pat. Off. . |
| 0612117 | 8/1994 | European Pat. Off. . |
| 3826281 | 2/1990 | Germany . |
| 9005387 | 5/1990 | WIPO . |
| 9218425 | 10/1992 | WIPO . |
| 9308612 | 4/1993 | WIPO . |

*Primary Examiner*—Stephen Kalafut

[57] ABSTRACT

A high capacity primary or secondary electrochemical generator in which at least one electrode (4,5) is composed of nanocrystalline particles of an electrically active material, said particles being electrically connected together, either by sintering a colloidal film of said electrically active material, or by compressing a mixture containing said nanocrystalline particles in pulverised form.

10 Claims, 4 Drawing Sheets

PRIMARY OR SECONDARY ELECTROCHEMICAL GENERATOR HAVING A NANOPARTICULATE ELECTRODE

FIELD OF THE INVENTION

The instant invention relates to a high capacity primary or secondary electrochemical generator and, more particularly, a generator in which at least one electrode is composed of nanocrystalline particles of an electrically active material, said particles being electrically connected together.

The invention also relates to an electrode of this type having a large ion exchange capacity that can be used as a cathode or anode in a primary or secondary electrochemical generator.

The invention also relates to processes for obtaining an electrode of this type from a colloidal solution of the electrically active material selected.

To increase the performances of electrochemical generators, in particular as regards energy density and power supplied, all the constituent elements of a generator, such as the choice of the couple of electrically active materials constituting the cathode and the anode, or the choice of the associated electrolyte as well as that of the solvent used have been investigated. The physical constitution of the generator elements, notably on the conformation of the electrodes in order to increase the ion exchanges has been considered.

DESCRIPTION OF THE PRIOR ART

U.S. Pat. No. 5,225,296 for example describes a type of carbon electrode that can be used as a cathode or anode, in which a high porosity is obtained by connecting together carbon fibres and carbon powder, the size of the particles being of the order of tens of microns.

U.S. Pat. No. 5,211,933 describes a process in which the particles of active material for an electrode are obtained by using as precursor a colloidal solution of the same active material, either directly by sintering the said colloidal solution, or by thermic dehydration to obtain a powder subsequently transformed into pellets by compression. The size of the particles of electrically active material obtained according to this process is of the order of microns.

BRIEF SUMMARY OF THE INVENTION

As compared to these known features of the prior art, the invention provides an electrochemical generator in which at least one electrode has in its composition an electrically active material in the form of particles of a size between 1 and 300 nm, preferably 5 to 50 nm, said particles being electrically connected together. The electrically active material in the form of nanoparticles is, for example, obtained using a colloidal solution, either directly or after transformation into powder by lyophilisation, or by any other suitable process.

BRIEF DESCRIPTION OF THE INVENTION

When the colloidal solution is directly used, a film is deposited onto a conducting support and brief sintering is carried out to connect the particles together electrically. The particles connected together by sintering form a nanostructure having a high coefficient of roughness, comprising between 10 and 10,000, the high value of this coefficient determining the capacity of energy storage. This roughness increases by a value of approximately 100 by micron of thickness. Thus, for a layer 5 thick, the coefficient of roughness is 500 and this coefficient is 1,000 for 10. A suitable thickness for the desired storage capacity lies between 5 and 100. When the colloidal solution is transformed into powder by lyophilisation, the powder is incorporated into a mixture containing carbon powder and a bonding material, then compressed into pellets which are then vacuum dried on a conducting support.

An electrode of this type having in its composition an electrically active material in the form of nanoparticles provides a high energy storage capacity and may be used in both primary and secondary electrochemical generators. Similarly, an electrode of this type can be used in an electrochemical generator having an aqueous or non aqueous electrolyte, but is preferably used with an aprotic electrolyte. The electrolyte used is preferably an electrolyte containing ions of alkali or alkaline earth metals. According to a preferred embodiment, the electrolyte contains lithium ions brought into the form of one of its salts such as hexafluorophosphonate, hexafluoroarsenate, bis (trifluoromethylsulfonyl) imide, trifluoromethanesulfonate, tris (trifluoromethylsutfonyl) methide, tetrafluoroborate, perchlorate, tetrachloroaluminate or perfluorobutanesulfonate. According to this preferred embodiment, the solvent of the electrolyte is an aprotic solvent such as -butyrolactone, tetrahydrofuran, 1,2-dimethoxyethane, propylene carbonate, ethylene carbonate, dimethylene carbonate, diethylene carbonate, diethyl ether or dioxalane, or a mixture of these solvents. The material used for at least one electrode in the form of nanoparticles may be any electrically active material, but according to a preferred embodiment, this material is chosen so as to form an intercalated compound with alkali or alkaline earth metals, thereby providing a secondary electrochemical generator. An electrically active material of this type will, for example, be chosen from the oxides, chalcogens or selenides of transition metals or their lithiated or partially lithiated forms, such as $TiO_2$, $Nb_2O_5$, $HfO_2$, $MnO_2$, $TiS_2$, $WS_2$, $TiSe_2$, $Li_yNiO_2$, $Li_yCoO_2$, $Li_y(NiCo)O_2$ or $Li_yMn_2O_4$. According to a preferred embodiment of the invention, an electrode, which may be the cathode or the anode depending on the electrical activity of the material used for the other electrode, is composed of nanoparticles of titanium dioxide in the octahedrite form or in the form of a mixture of octahedrite and rutile, containing more than 50% octahedrite. In the presence of lithium ions, the titanium dioxide in nanocrystalline form is liable to form an intercalated compound $Li_xTiO_2$ in which the intercalation coefficient x has a high value between 0.8 and 1. For a cell in which x=0.8, the theoretical energy density is 400 W.h.kg$^{-1}$ assuming a mean cell voltage of 1.5 volts. Results of this kind cannot be obtained with the technologies of the prior art, such as that described by W. J. Macklin et al. (Solid State Ionics 53–56 (1992) 694–700) in which the value of the intercalation coefficient is about 0.5.

When an electrically active compound also capable of intercalating lithium ions is used for the other electrode, the electrochemical generator of the invention is a secondary (rechargeable) generator of the "rocking chair" type, the principle of which was described for the first time by M. Armand (Materials for Advanced Batteries, D. W. Murphy et al. Editors p. 145 Plenum Press, N.Y.—1980).

BRIEF DESCRIPTION OF THE DRAWINGS

The features and advantages of the invention are further set out in the following examples, given by way of nonlimiting example with reference to the appended drawings in which.

DETAILED DESCRIPTION OF THE INVENTION

The features of the electrode used in the electrochemical generator of the invention have been evaluated using a laboratory measuring cell having an electrode of about 0.5 cm$^2$, composed of a support having a conducting coating on which a film of $TiO_2$ (octahedrite) in the form of nanoparticles is produced by sintering a colloidal solution. The electrolyte used is composed of a 1M solution of $LiClO_4$ in propylene carbonate. Finally, the cell has a platinum counter-electrode and a reference electrode of Ag/AgCl. The colloidal solution of $TiO_2$ is obtained by hydrolysis of tetraisopropoxytitanium, followed by autoclaving at 200° C. for 12 hours, then evaporation of the water in a vacuum at 25° C. until a suitable viscosity is obtained in order to deposit a film on the conducting support. The film thereby obtained is sintered at 450° C. for 30 minutes to bond the nanoparticles together electrically. This yields a structure about 10 thick, the particle size of which is about 10 nm. When the electrode that has just been described discharges, the nanostructured film of $TiO_2$ is capable of intercalating in reversible and rapid manner the amounts of lithium needed to obtain a large energy capacity, according to the reaction (1):

$$TiO_2 + xLi^+ + xe^- \rightarrow Li_xTiO_2 \qquad (1)$$

Figure 1:
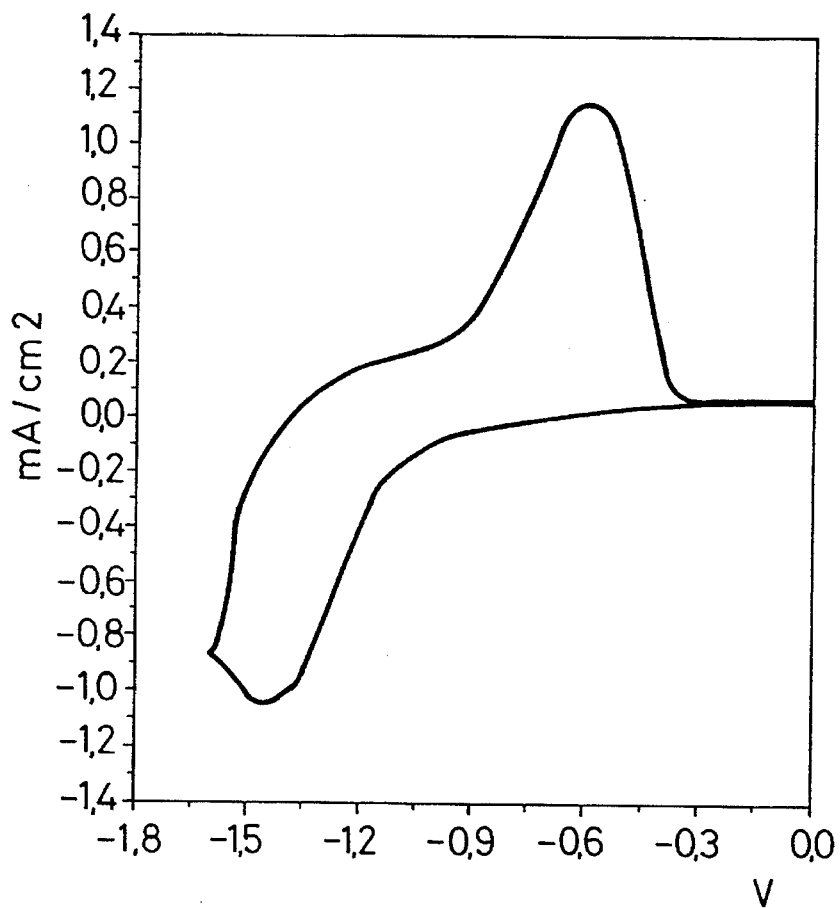
FIG. 1 shows a voltametric curve obtained with a cell, one electrode of which is composed of $TiO_2$ (octahedrite) in the form of nanoparticles.

The reversible and rapid effect is clearly visible on the voltametric curve of FIG. 1, effected with a sweeping speed of 0.5 mV–s$^{-1}$. The cathode peak is due to intercalation of the Li$^+$ ions into the structure of the $TiO_2$, whereas the anode peak comes from the removal of the Li$^+$ ions of the $TiO_2$ film in the electrolyte, which corresponds to the reverse reaction of reaction (1). The charge stored during the cycle is respectively 0.9 C.cm$^{-2}$ when the potential is increased and 1.0 C.cm$^{-2}$ when it is decreased. Bearing in mind the total amount of $TiO_2$ deposited on the cathode, this corresponds to an intercalation coefficient x=0.8.

Repeating the same experiment with a film of $TiO_2$ deposited on the conducting support by the vapour phase process, and thus having a smooth surface without nanoparticulate structure, a cathode charge of $1.00.10^{-3}$ C–cm$^{-2}$ and an anode charge of $1.33.10^{-3}$ C cm$^{-2}$ are measured respectively, that is a charge capacity about 1000 times weaker. This comparative trial establishes the importance of the nanoparticulate nature of the electrically active material used for at least one electrode.

Figure 2:
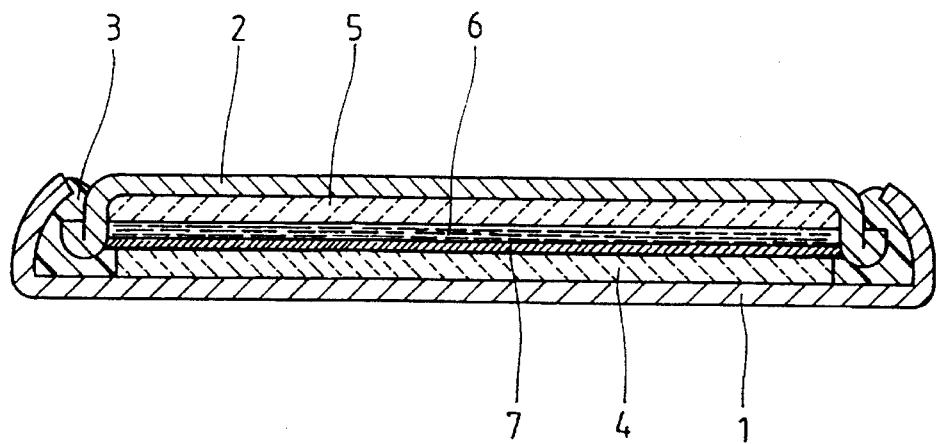
FIG. 2 shows a side view of an electrochemical generator of the invention with a partial sector showing the arrangement of the internal layers.

The following examples correspond to the embodiment of a secondary electrochemical generator of the invention in the form of a button type accumulator, such as shown in FIG. 2, it being understood that other types of accumulators can be manufactured without departing from the scope of the invention.

An accumulator of this type has at its lower part a housing 1 and, at its upper part a lid 2, held in place and electrically insulated from the housing by a sealing ring 3. These three elements define an inside space having on the floor of the housing 1, serving as conducting support, the electrically active material of the cathode 4, on the inside of the lid 2, serving as conducting support, the electrically active material of the anode 5, the two electrodes being ionically connected by an electrolyte optionally impregnated in a non-conducting porous material forming a reservoir 6, it also being possible to interpose a porous separator 7 between the reservoir 6 and the cathode 4.

These examples illustrate the two embodiments, depending on whether the nanoparticles of the electrically active material are electrically connected by sintering or by compression.

EXAMPLE 1

According to a first embodiment, a secondary electrochemical generator of the "rocking chair" type has $TiO_2$ (octahedrite) in the form of nanoparticles electrically connected together by sintering as electrically active material at the anode. For this purpose, a film of a colloidal solution of $TiO_2$ obtained by hydrolysis of a solution of tetraisopropoxy titanium and autoclaving at 200° C. is disposed on the bottom of the lid 2, having a surface of about 1 cm$^2$, said film then being sintered at 450° C. The nanostructured film thereby obtained is 3.5 thick, the particles of $TiO_2$ having a size of between 8 and 12 nm. The electrically active material used for the cathode is of lithium cobalt dioxide $Li_yCoO_2$ and the electrolyte is a 1M solution of $LiN(CF_3SO_2)_2$ in a mixture of ethylene carbonate and 1,2-dimethoxyethane (50/50 w/w).

During the charging cycle the lithium ions are intercalated in the nanostructured film of $TiO_2$ to give $Li_xTiO_2$.

During the discharge cycle, the lithium ions released by the $Li_xTiO_2$ film are intercalated in the lithiated cobalt dioxide, acting as cathode according to the reaction (2)

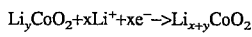

$$Li_yCoO_2 + xLi^+ + xe^- \rightarrow Li_{x+y}CoO_2$$

Figure 3:
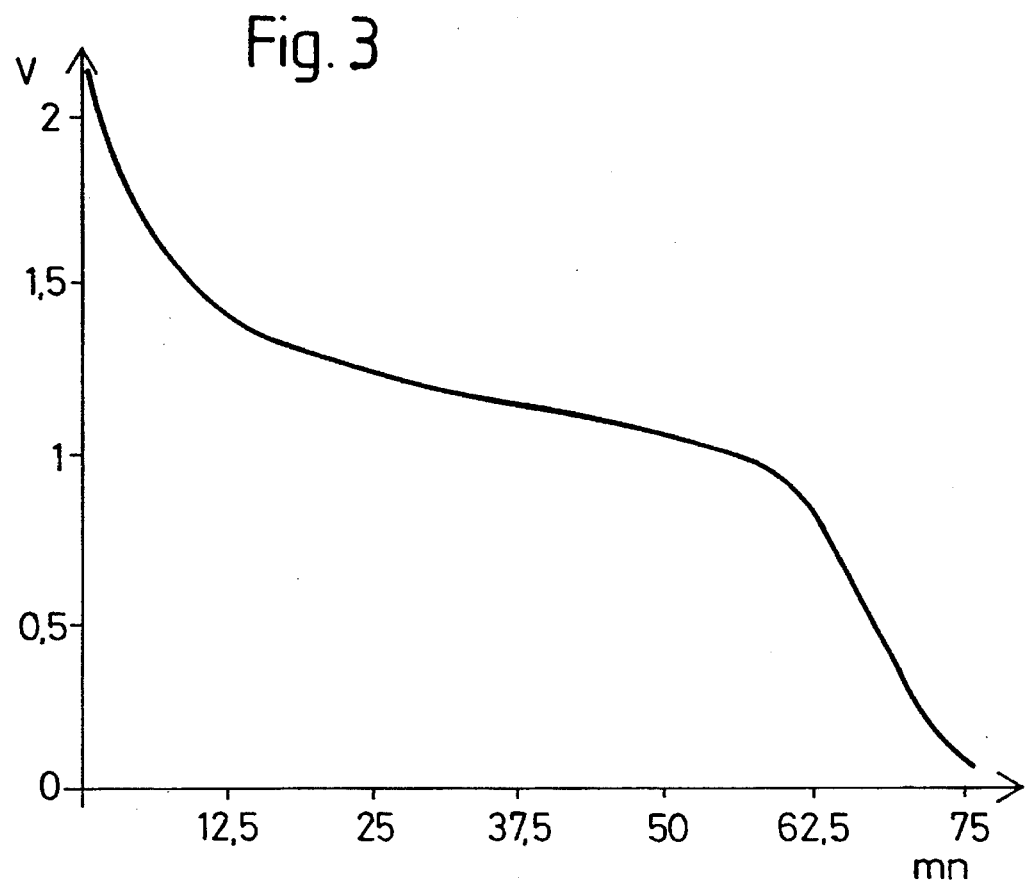
FIG. 3 shows a discharge curve of the first embodiment of the electrochemical generator of the invention.

FIG. 3 shows the discharge curve obtained over time across a resistance of 10 k. The curve has a shape which is characteristic of rechargeable electrochemical generators. Subjected to charge/discharge cycles, the capacity was found constant to within 10% after 240 cycles.

EXAMPLE 2

According to a second embodiment, a secondary electrochemical generator of the "rocking chair" type has $TiO_2$ (octahedrite) in the form of nanoparticles electrically connected together by compression with a carbon powder and a bonding material as electroactive material at the anode. For this purpose, a powder of nanoparticles of $TiO_2$ is first prepared by lyophilisation of a colloidal solution obtained as shown in example 1.

An aqueous colloidal solution of $TiO_2$ at 5% by weight at pH 1.0 is autoclaved for 12 hours at 200° C., then concentrated in a vacuum at 30° C. until it is 10% by weight. Isopropanol is added to 200 g of this solution with shaking until 600 g of solution are obtained which are subjected to ultrasonic treatment for 20 minutes to carefully redisperse the nanoparticles of $TiO_2$.

Lyophilisation is then carried out using an apparatus having a vane pump (2 stages, $4 m^3/h$) and two liquid nitrogen traps in series, one of which, intended for water and isopropanol, is connected to a glass support for 4 250 ml flasks, provided with spherical ground glass joints and Viton® seals. 150 g of the preceding solution are introduced into each flask, maintained in liquid nitrogen, in the form of a spray. After mounting the flasks in the vacuum apparatus the pump is started up. The starting pressure is 0.2 mbar, and cooling is effected until a lower pressure of 0.1 mbar is reached.

Lyophilisation is continued for 72 hours until a dry powder of $TiO_2$ is obtained, the final pressure being about 0.01 mbar.

The powder thereby obtained is made into a paste containing 70 to 95%, preferably 88% of $TiO_2$, 2 to 20%, preferably 10% of graphite having a granulometry of about 10 and 1 to 10%, preferably 2% ethylene propylene diene monomer by moistening with cyclohexane. The paste thereby obtained is then dried at 90° C. for 5 hours, then pulverised in a ball mill until grains of about 3 are obtained. An amount of 109 mg of the powder thereby obtained is compressed between 10 and 100 $kN \cdot cm^{-2}$. preferably at 40 $kNcm^{-2}$ to form a pellet 12.4 mm in diameter and 0.40 mm thick. The pellet thereby obtained is applied to the current collector of the anode and dried in a vacuum at 160° C. for 12 hours. The electroactive material used for the cathode is $Li_y(NiCo)O_2$, in the form of a pellet produced using a process comparable to that which has just been described. For this purpose 70 to 90%, preferably 80% of $Li_y(NiCo)O_2$, 1 to 40%, preferably 10% of graphite and 10% of polytetrafluoroethylene are intimately mixed and the resulting product is compressed between 10 and 100 $kN \cdot cm^{-2}$, preferably 70 $kN \cdot cm^{-2}$ to obtain a pellet 12.4 mm in diameter and 0.32 mm thick which is then applied to the current collector of the cathode by drying at 160° C. The electrolyte used is the same as that in example 1, impregnated in polypropylene fibres, a microporous polypropylene separator being interposed between the cathode and the fibres impregnated with electrolyte.

Figure 4:
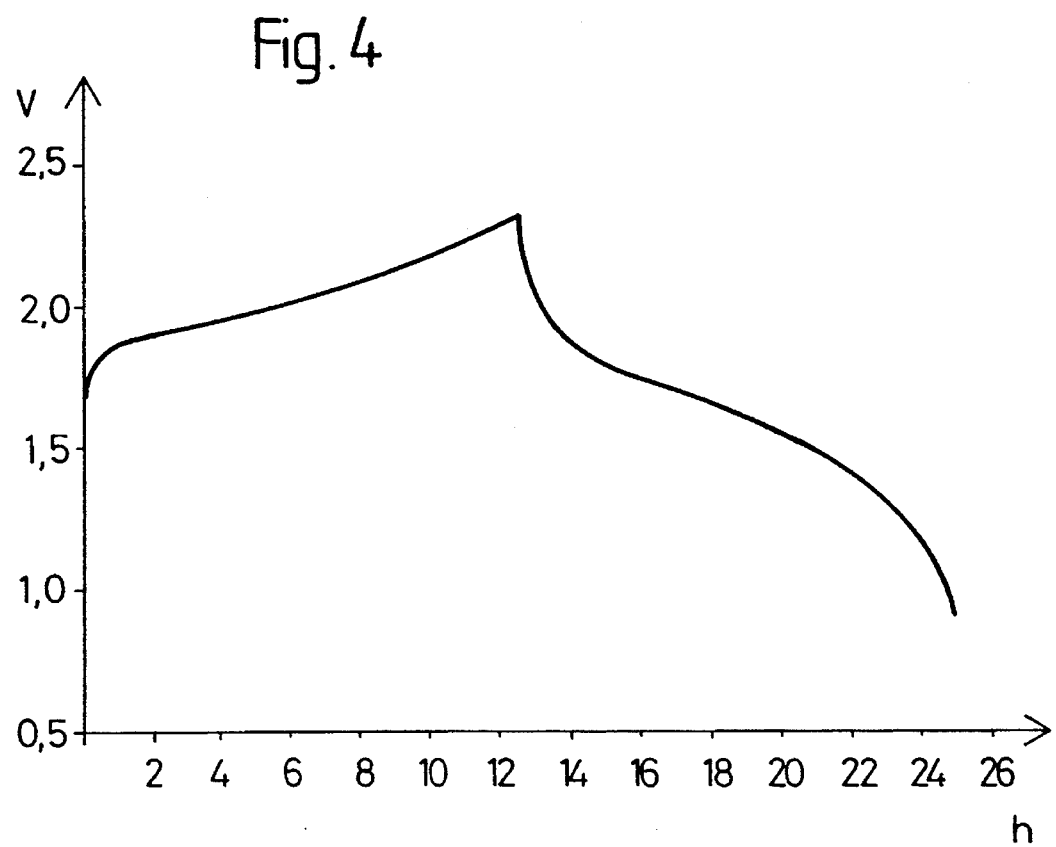
FIG. 4 shows a charging and discharging curve of a second embodiment of an electrochemical generator of the invention.

The electrochemical generator of this second embodiment was subjected to charge/discharge cycles with a constant charge current and discharge current of 0.5 mA, by increasing the charge until a maximum voltage of 2.3 V and by stopping the discharge at a minimum voltage of 1 V. FIG. 4 shows an example of charge/discharge curve at the end of the 15th cycle.

Figure 5:
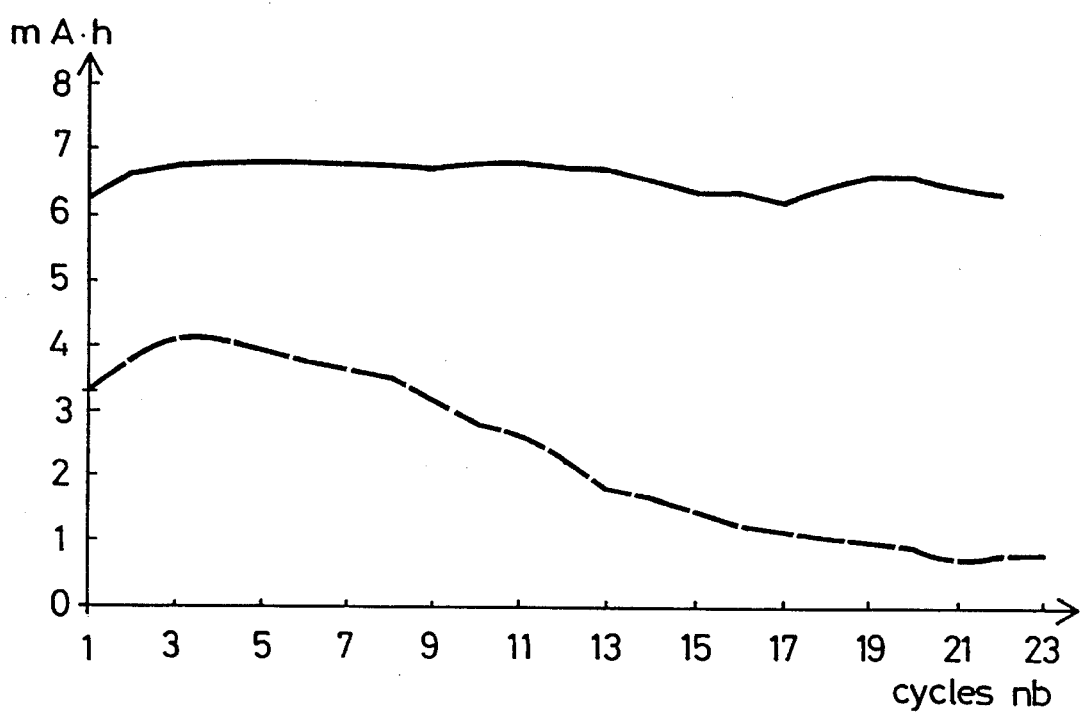
FIG. 5 shows the development of the capacity of the second embodiment as a function of the number of charging/discharging cycles, compared to an electrochemical generator having the same electroactive materials, none of which is in the form of nanoparticles.

The reference electrochemical generator was produced using the same process as that just described, but replacing the nanoparticulate $TiO_2$ by a commercial product, for example supplied by Fluka AG, Buchs. FIG. 5 shows the variation up to the 23rd cycle of the charge capacity of a generator of the invention (solid line), compared to that of the reference generator (dotted line). This curve shows, on the one hand, that the capacity is higher and, on the other hand, that this capacity is maintained substantially constant during the cycles, whereas that of the reference generator is weaker and decreases very substantially as a function of the number of cycles undergone.

Figure 6:
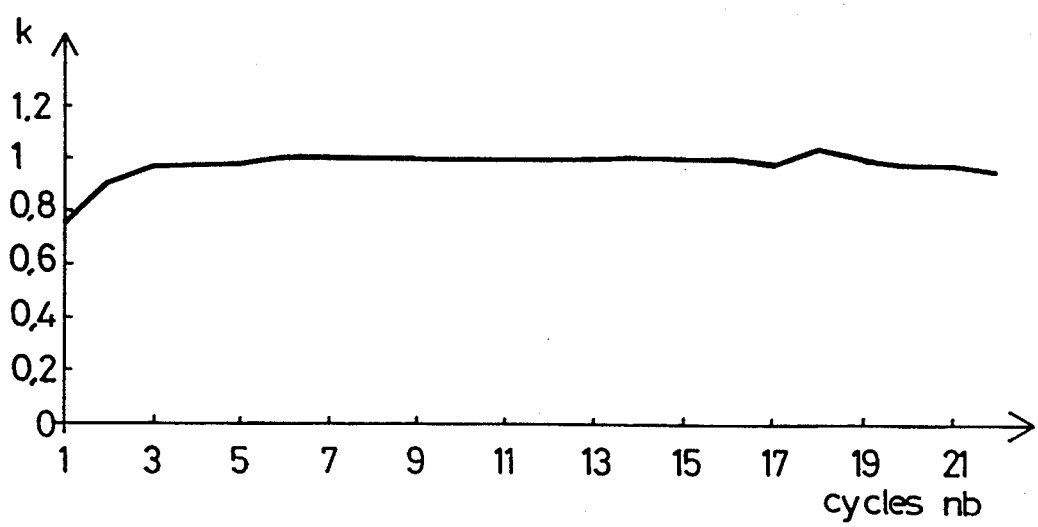
FIG. 6 shows the variation in the ratio between the charging capacity and the discharging capacity of the second embodiment as a function of the number of cycles.

Maintenance of the initial features of the electrochemical generator of the invention is also confirmed by the curve of FIG. 6 which shows the development of the ratio k between the charge capacity and the discharge capacity during the cycles, this ratio k being representative of the cyclability of the electrochemical generator.

EXAMPLE 3

Figure 7:
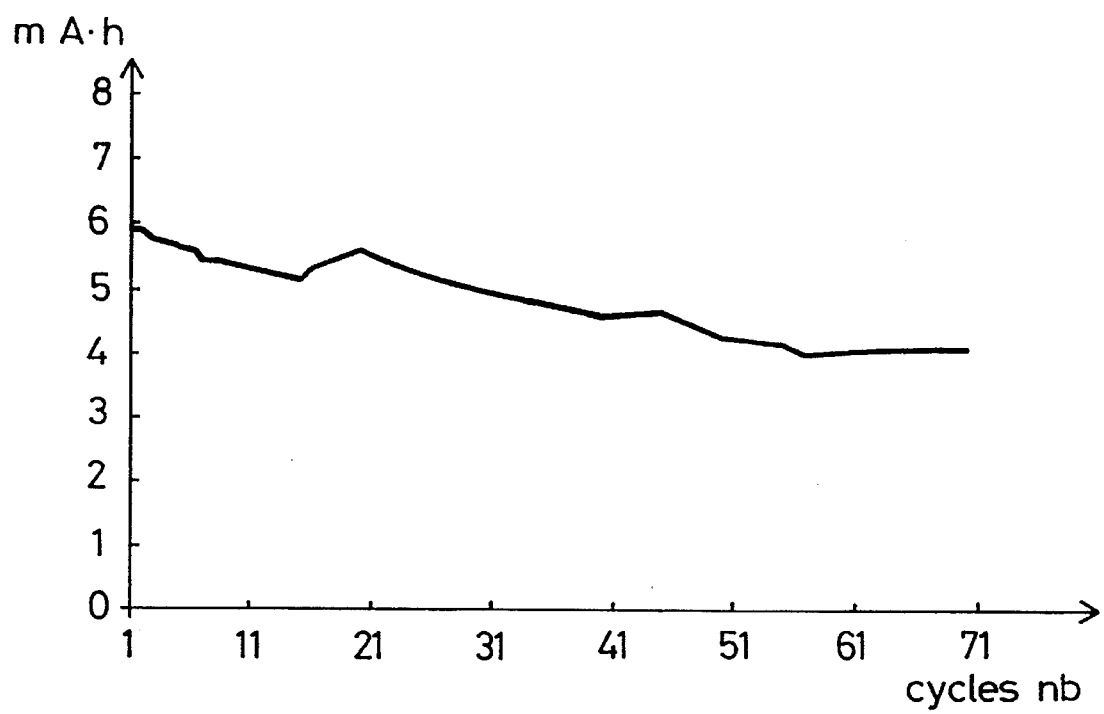
FIG. 7 shows the development of the capacity of a variant of the second embodiment as a function of the number of cycles.
Figure 8:
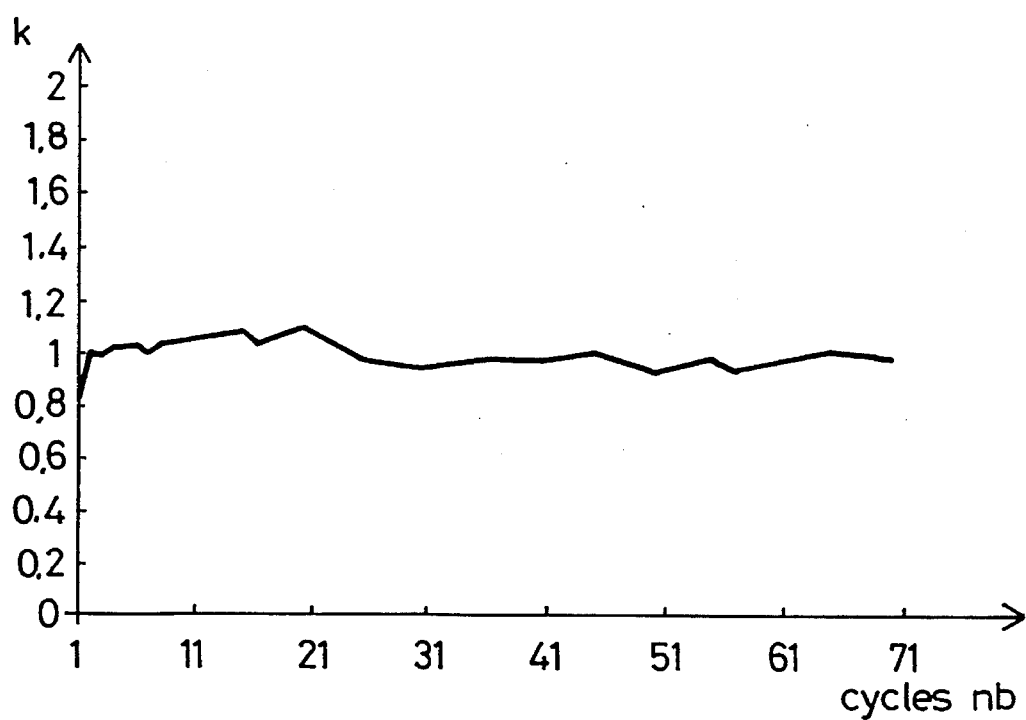
FIG. 8 shows the development of the ratio between the charging capacity and the discharging capacity of a variant of the second embodiment as a function of the number of cycles.

According to a variant of the second embodiment described in example 2, the pellet of the anode is obtained from an initial mixture composed of 88% nanoparticulate $TiO_2$, 10% graphite and 2% polytetrafluoroethylene, by compression at 40 $kN \cdot cm^{-2}$ of 70 mg of pulverised mixture, said pellet then being placed between two metal lattices of stainless steel serving as collector. The cathode and the electrolyte are the same as those used in example 2. The electrochemical generator thereby obtained was subjected to charge/discharge cycles under the same conditions as those of example 2. The results recorded are shown by the curves in FIGS. 7 and 8 which correspond respectively to the development of the capacity and to the development of the ratio k between the charge capacity and the discharge capacity up to the 71st cycle. These curves show that the generator thereby obtained has a large capacity and an excellent cyclability.

Remaining within the scope of the invention it is also possible to construct different primary or secondary electrochemical generators, for example, by choosing a different couple of electroactive materials for the cathode and the anode, or a different electrode, provided the electroactive material of at least one electrode is composed of nanoparticles of the said material.

We claim:

1. A high capacity primary or secondary electrochemical generator having two electrodes supporting different electroactivated materials, said electrodes being connected together by an electrolyte, characterised in that the electroactive material used in the composition of at least one electrode includes an oxide of transition metals or their lithiated or partially lithiated forms selected from $TiO_2$, $Nb_2O_5$, $HfO_2$, $MnO_2$, $Li_yNiO_2$, $Li_yCoO_2$, $Li_y(NiCo)O_2$, or $Li_yMn_2O_4$ in the form of nanocrystalline particles having a size between 1 and 250 nm, said particles being electrically connected together.

2. An electrochemical generator according to claim 1, characterised in that the nanocrystalline particles of the electrically active material are electrically connected together by compressing in the form of pellets a mixture composed of said particles obtained in pulverized form from a colloidal solution of the said electrically active material, of carbon powder and of a bonding material, then drying said pellets deposited on a conducting support in a vacuum.

3. An electrochemical generator according to claim 1, characterised in that the electrolyte contains alkali or alkaline earth metals in cationic form.

4. An electrochemical generator according to claim 3, characterised in that the alkali metal is lithium in the form of one of its salts chosen from hexafluorophosphate, hexafluoroarsenate, bis (trifluoromethylsulfonyl) imide, trifluoromethanesulfonate, tris (trifluoromethylsulfonyl)

methide, tetrafluroborate, perchlorate, tetrachloroaluminate and perfluorobutanesulfate.

5. An electrochemical generator according to claim 1, characterised in that the electrolyte includes an aprotic solvent selected from δ-butyrolactone, tetrahydrofuran, 1,2-dimethoxyethane, propylene carbonate, ethylene carbonate, dimethylene carbonate, diethylene carbonate, diethyl ether and dioxalane, or a mixture of these solvents.

6. An electrochemical generator according to claim 1, characterised in that the electrically active material of one electrode, or of each of the two electrodes, is capable of forming an intercalated compound with the alkali or alkaline earth metals.

7. An electrochemical generator according to claim 6, characterised in that the electrically active material of one electrode is composed of nanocrystalline particles of $TiO_2$ mainly in octahedrite form.

8. An electrochemical generator according to claim 2, characterised in that the composition of the negative electrode includes nanocrystalline $TiO_2$, and the composition of the positive electrode includes $Li_y(NiCo)O_2$, the electrolyte being composed of a 1M solution of trifluoromethane sulfonimide of lithium in a mixture 50/50 by weight of ethylene carbonate and dimethoxyethane.

9. An electrochemical generator according to claim 8, characterised in that the negative electrode is obtained by compression on a current collector of a mixture containing 70 to 95% of nanocrystalline $TiO_2$, 2 to 20% graphite, and as binding agent 1 to 10% ethylene propylene diene monomer, at a pressure between 10 and 100 $kN \cdot cm^{-2}$, the pellet thereby obtained then being dried in a vacuum at about 160° C. for about 12 hours.

10. An electrochemical generator according to claim 8, characterised in that the positive electrode is obtained by compression on a current collector of a mixture containing 70 to 90% of $Li_y(NiCo)O_2$, 1 to 40% of graphite powder, and as binding agent 1 to 20% of polytetrafluoroethylene, at a pressure between 10 and 100 $kN \cdot cm^{-2}$, the pellet thereby obtained then being dried in a vacuum at about 160° C. for about 12 hours.

* * * * *